US012783000B2

(12) United States Patent
Kaffl et al.

(10) Patent No.: US 12,783,000 B2
(45) Date of Patent: Nov. 3, 2026

(54) INTERNAL CLOCK MONITORING USING EXTERNAL CLOCK PROVIDED BY COMMUNICATION INTERFACE

(71) Applicant: Infineon Technologies AG, Neubiberg (DE)

(72) Inventors: Georg Kaffl, Prutting (DE); Benjamin Kollmitzer, Pörtschach am Wörther See (AT); Ahsan Ali, Villach (AT)

(73) Assignee: Infineon Technologies AG, Neubiberg (DE)

( * ) Notice: Subject to any disclaimer, the term of this patent is extended or adjusted under 35 U.S.C. 154(b) by 313 days.

(21) Appl. No.: 18/467,955

(22) Filed: Sep. 15, 2023

(65) Prior Publication Data

US 2025/0093904 A1 Mar. 20, 2025

(51) Int. Cl.
*G06F 1/12* (2006.01)
*G06F 1/10* (2006.01)

(52) U.S. Cl.
CPC . *G06F 1/12* (2013.01); *G06F 1/10* (2013.01)

(58) Field of Classification Search
CPC ................. G06F 1/10; G06F 1/12; G06F 1/14
USPC ........................................................... 713/400
See application file for complete search history.

(56) References Cited

U.S. PATENT DOCUMENTS 5,930,294 A * 7/1999 Chapman ............ H04L 25/0262 370/503
7,058,729 B1 * 6/2006 Le Scolan ......... H04L 12/40058 375/357
7,272,527 B1 * 9/2007 Suto ................. G01R 31/31727 702/182
8,937,496 B1 * 1/2015 Ahmad .................... H03K 5/19 327/39
2012/0286825 A1 * 11/2012 Baus ........................ H03K 5/19 327/39
2015/0378960 A1 * 12/2015 Huffman ............. G06F 13/4072 710/313
2016/0147684 A1 * 5/2016 Sengoku ............. G06F 13/4282 710/105
2019/0114235 A1 * 4/2019 Wojewoda .......... G06F 11/1604
2020/0264012 A1 * 8/2020 Haug ......................... H04L 7/08
2020/0327007 A1 * 10/2020 Kho .................... G06F 11/0757
2022/0091186 A1 * 3/2022 Durga ........................ G06F 1/10
2023/0152371 A1 * 5/2023 Lin .................. G01R 31/31727 377/19

(Continued)

*Primary Examiner* — Jaweed A Abbaszadeh
*Assistant Examiner* — Cheri L Harrington
(74) *Attorney, Agent, or Firm* — Harrity & Harrity, LLP

(57) ABSTRACT

An integrated circuit (IC) includes an internal clock source configured to generate an internal clock signal; a communication interface configured to receive an external clock signal from an external clock source and a communication frame signal that signals a communication frame during which data communication between the IC and the external clock source is enabled, wherein the external clock signal and the communication frame signal are received in parallel; and a clock monitoring circuit configured to monitor the internal clock signal based on the external clock signal. The clock monitoring circuit is configured to compare the internal clock signal and the external clock signal during the communication frame, and generate a timing error signal if a frequency of the internal clock signal does not satisfy a predetermined threshold relative to a frequency of the external clock signal.

12 Claims, 7 Drawing Sheets

(56) References Cited

U.S. PATENT DOCUMENTS

| | | | | |
|---|---|---|---|---|
| 2023/0349969 | A1* | 11/2023 | Colombo | G06F 11/27 |
| 2025/0052812 | A1* | 2/2025 | Aneja | G06F 1/324 |

* cited by examiner

500

$n_{clk}$: clock-count per SCK-period
$n_{frame}$: clock-count per communication frame
$N_{SCK}$: SPI frame width
$f_{SPI}$: configured SPI frequency
$f_{clk}$: internal oscillator frequency
$n_{targetclk}$: Target clock-count per SCK period
$n_{targetframe}$: Target clock-count per communciation frame 1. Check per SCK period: $\left|\left(n_{CLK}\frac{f_{SPI}}{f_{clk}}-1\right)\cdot 100\%\right|<$ safety-limit [%] e.g., 5%

2. Check per SCK period: $\left|\left(\frac{n_{frame}}{N_{SCK}}\cdot\frac{f_{SPI}}{f_{clk}}-1\right)\cdot 100\%\right|<$ safety-limit [%] e.g., 1%

3. Check per communication clock cycle-absolute: $\left|\left(\frac{n_{clk}}{n_{SCK}}-n_{targetclk}\right)\right|<$ safety-limit [clockcycle] e.g., 2 clockcycles 4. Check per communication clock cycle-relative: $\left|\left(\frac{n_{clk}}{n_{SCK}\cdot n_{targetclk}}-1\right)\cdot 100\%\right|<$ safety-limit [%] e.g., 5%

5. Check per communication frame-absolute: $\left|\left(\frac{n_{frame}}{n_{SCK}}-n_{targetframe}\right)\right|<$ safety-limit [clockcycle] e.g., 2 clockcycles 6. Check per communication frame-relative: $\left|\left(\frac{n_{frame}}{n_{SCK}\cdot n_{targetframe}}-1\right)\cdot 100\%\right|<$ safety-limit [%] e.g., 1%

FIG. 5

INTERNAL CLOCK MONITORING USING EXTERNAL CLOCK PROVIDED BY COMMUNICATION INTERFACE

BACKGROUND

When a digital sensor is used, clock monitoring is an essential safety measure to ensure detection of common cause failures. However, monitoring a clock signal that is generated internally by the digital sensor can typically only be implemented with low accuracy and limited diagnostic coverage giving only marginal benefit, or with high accuracy and considerable effort. When performed internally by the digital sensor, the clock monitoring also requires a redundant clock source, which needs to be tested before the redundant clock can be used reliably for the clock monitoring. For high accuracy, that clock source needs to be trimmed as well. Trimming and testing of the redundant clock increase chip area of the digital sensor and increases test times, both of which result in higher costs. The trimming of the redundant clock is inherently dependent on a digital core of the digital sensor, which reduces the diagnostic coverage of the safety mechanism. Especially because the safety mechanism is usually implemented to protect the digital core from the common cause failure of faulty clock signal.

SUMMARY

In some implementations, a communication system includes a first integrated circuit (IC) comprising: a first clock source configured to generate a first clock signal; a counter configured to receive the first clock signal and increment or decrement a counter value based on the first clock signal; and a first communication interface configured to receive the counter value from the counter and transmit the counter value from the first IC; and a second IC comprising: a second clock source configured to generate a second clock signal; a sampling circuit configured to acquire a first sample of the counter value at a first sampling time, acquire a second sample of the counter value at a second sampling time, and calculate a difference value as a difference between the second sample and the first sample; and a clock monitoring circuit configured to monitor the first clock signal based on the second clock signal, wherein the clock monitoring circuit is configured to compare the difference value to the second clock signal and generate a timing error signal if the difference value deviates from a clock value derived from the second clock signal by more than a predetermined threshold.

In some implementations, an integrated circuit (IC) includes an internal clock source configured to generate an internal clock signal; a communication interface configured to receive an external clock signal from an external clock source and a communication frame signal that signals a communication frame during which data communication between the IC and the external clock source is enabled, wherein the external clock signal and the communication frame signal are received in parallel; and a clock monitoring circuit configured to monitor the internal clock signal based on the external clock signal, wherein the clock monitoring circuit is configured to compare the internal clock signal and the external clock signal during the communication frame, and generate a timing error signal if a frequency of the internal clock signal does not satisfy a predetermined threshold relative to a frequency of the external clock signal.

In some implementations, a method of monitoring an internal clock source of an integrated circuit (IC) using an external clock signal includes generating, by the internal clock source, an internal clock signal; receiving, by a communication interface of the IC, the external clock signal from an external clock source; receiving, by the communication interface of the IC, a communication frame signal from the external clock source, wherein the communication frame signal signals a plurality of communication frames during which data communication between the IC and the external clock source is enabled, and wherein the external clock signal and the communication frame signal are received in parallel; and monitoring, by a clock monitoring circuit of the IC, the internal clock signal based on the external clock signal, including: comparing the internal clock signal and the external clock signal during the plurality of communication frames; and generating a timing error signal if a frequency of the internal clock signal does not satisfy a predetermined threshold relative to a frequency of the external clock signal, wherein monitoring the internal clock signal is disabled outside of the plurality of communication frames.

In some implementations, a communication system includes a first integrated circuit (IC) comprising: a first clock source configured to generate a first clock signal; and a communication interface configured to generate a communication signal having a signal period proportional to a first clock period of the first clock signal, and transmit the communication signal; a second IC comprising: a second clock source configured to generate a second clock signal having a second clock period; a sampling circuit configured to detect transition edges of the communication signal to determine the signal period of the communication signal; a scaler configured to scale the signal period by a first scaling factor to derive a first clock value representative of the first clock period of the first clock signal; and a clock monitoring circuit configured to monitor the first clock signal based on the second clock signal, wherein the clock monitoring circuit is configured to receive the first clock value from the scaler, and generate a timing error signal if the first clock value deviates from a second clock value derived from the second clock signal by more than a predetermined threshold.

BRIEF DESCRIPTION OF THE DRAWINGS

Implementations are described herein with reference to the appended drawings.

FIG. 5 is a diagram that shows example algorithms that may be used for monitoring an internal clock source according to one or more implementations.

DETAILED DESCRIPTION

Figure 1:
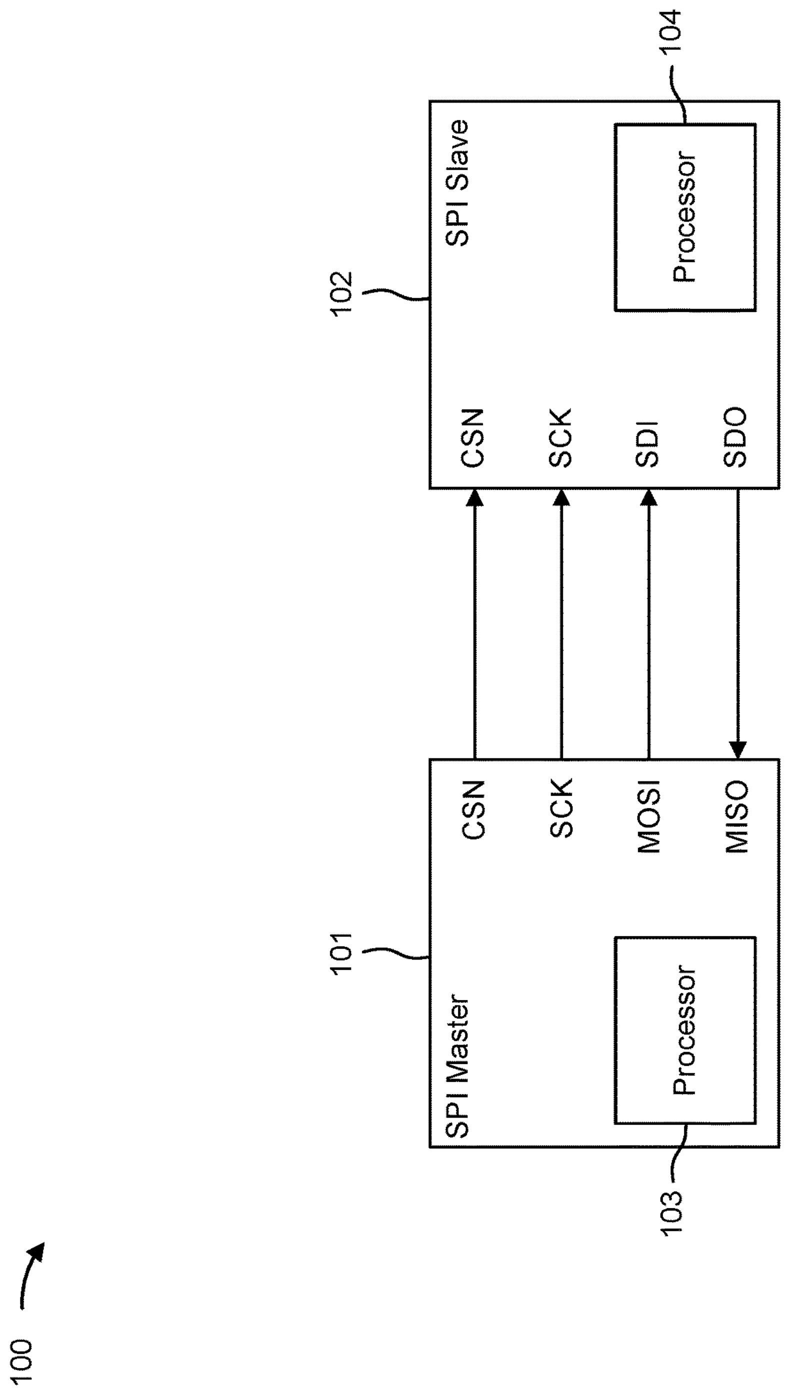
FIG. 1 is a schematic block diagram of a communication system according to one or more implementations.

In the following, details are set forth to provide a more thorough explanation of example implementations. However, it will be apparent to those skilled in the art that these implementations may be practiced without these specific details. In other instances, well-known structures and devices are shown in block diagram form or in a schematic view, rather than in detail, in order to avoid obscuring the implementations. In addition, features of the different implementations described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually interchangeable.

It will be understood that when an element is referred to as being “connected” or “coupled” to another element, it can be directly connected or coupled to the other element or intervening elements may be present. In contrast, when an element is referred to as being “directly connected” or “directly coupled” to another element, there are no intervening elements present. Other words used to describe the relationship between elements should be interpreted in a like fashion (e.g., “between” versus “directly between,” “adjacent” versus “directly adjacent,” etc.).

In implementations described herein or shown in the drawings, any direct electrical connection or coupling (e.g., any connection or coupling without additional intervening elements) may also be implemented by an indirect connection or coupling (e.g., a connection or coupling with one or more additional intervening elements, or vice versa) as long as the general purpose of the connection or coupling (e.g., to transmit a certain kind of signal or to transmit a certain kind of information) is essentially maintained. Features from different implementations may be combined to form further implementations. For example, variations or modifications described with respect to one of the implementations may also be applicable to other implementations unless noted to the contrary.

As used herein, the terms “substantially” and “approximately” mean “within reasonable tolerances of manufacturing and measurement.” For example, the terms “substantially” and “approximately” may be used herein to account for small manufacturing tolerances or other factors (e.g., within 5%) that are deemed acceptable in the industry without departing from the aspects of the implementations described herein. For example, a resistor with an approximate resistance value may practically have a resistance within 5% of the approximate resistance value. As another example, a signal with an approximate signal value may practically have a signal value within 5% of the approximate signal value.

In the present disclosure, expressions including ordinal numbers, such as “first”, “second”, and/or the like, may modify various elements. However, such elements are not limited by such expressions. For example, such expressions do not limit the sequence and/or importance of the elements. Instead, such expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

“Sensor” may refer to a component which converts a property to be measured to an electric sensor signal (e.g., a current signal or a voltage signal). The property to be measured may, for example, comprise a magnetic field, an electric field, an electromagnetic wave (e.g., a radio wave), a pressure, a temperature, a force, a current, or a voltage, but is not limited thereto. A sensor device and a controller (e.g., a microcontroller) may be integrated on separate integrated circuits (ICs) (e.g., separate semiconductor chips). Accordingly, the sensor device may communicate with the controller via a communication bus, such as a serial peripheral interface (SPI). Accordingly, the sensor device may communicate with the controller via a communication interface, such as a pulse width modulation (PWM) interface, an incremental interface (e.g., an ABZ interface), or an interface emulating Hall switches (e.g., an UVW interface).

Components of the sensor device may operate on a basis of an internal clock used as a main clock. When using a digital sensor, clock monitoring of the main clock is an essential safety measure to ensure that each of the components of the digital sensor are operating correctly. Clock monitoring may also be used to detect common cause failures of the sensor device. The clock monitoring may be implemented by comparing the main clock with a redundant safety-clock that is generated by the sensor device independently of the main clock. A clock failure is detected if the comparison of the main clock and safety-clock falls outside specified safety limits. However, the redundant safety-clock needs to be tested and potentially trimmed, increasing chip area and test time and thus costs.

Accordingly, some implementations disclosed herein are directed to using an external clock source to perform the clock monitoring of the main clock of the sensor device (e.g., to perform safety-checks on the main clock of the sensor device). The external clock-source may be much more accurate than redundant safety-clocks generated by the sensor device, does not require dedicated trimming, and is independent of a sensor device architecture (e.g., independent of any limitations of a digital core of the sensor device). A digital communication interface may be used to provide internal clock information to an external device that performs the clock monitoring or may be used to receive an external reference clock signal from the external device to be used by the sensor device for performing the clock monitoring.

FIG. 1 is a schematic block diagram of a communication system 100 according to one or more implementations. The communication system 100 includes a master device 101, such as a microcontroller, and a slave device 102, such as a sensor device or other peripheral device. The slave device 102 can be any integrated circuit (e.g., a chip) comprising a data register and capable of performing data operations (e.g., read and write operations) from/to the data register at the control of the master device 101. Here, a read operation is a data transmission originating at the slave device 102 and terminating at the master device 101, and a write operation is a data transmission originating at the master device 101 and terminating at the slave device 102. The master and slave devices each include at least one processor for performing respective data operations.

In some implementations, the communication system 100 may be a serial peripheral interface (SPI) communication system. In an SPI communication configuration, the master device 101 and slave device 102 both include an SPI clock terminal connected by a clock signal line that transmits a clock signal SCK (e.g., a communication clock signal, such as an SPI clock signal). The device that generates the clock signal SCK is called the master. Data transmitted between the master and the slave is synchronized to the clock generated by the master. During SPI communication, the data is simultaneously transmitted (shifted out serially onto a MOSI/SDI signal line) and received (data on a MISO/SDO line is sampled or read in). A serial clock edge synchronizes the shifting and sampling of the data. The SPI interface provides the user with flexibility to select the rising or falling edge of the clock to sample and/or shift the data. Each clock cycle represents a bit.

For example, data present at Serial Data Input (SDI) may be latched on the rising edge of the clock signal SCK and data on Serial Data Out (SDO) may be shifted out at the falling edge of clock signal SCK. The SDI is a data input terminal of the slave device 102 and is connected to the master out, slave in (MOSI) terminal of the master device 101 by a data line. The master device 101 transmits information, including control information and data, to the slave device 102 via its MOSI terminal. The SDI terminal is used to transfer data serially into the slave device. The SDI terminal receives the data to be written. The SDO is a data output terminal of the slave device 102 and is connected to the master in, slave out (MISO) terminal of the master device 101 by a data line. The master device 101 receives (reads) information, from the slave device 102 via its MISO terminal. The SDO terminal is used to transfer data serially out of the slave device. The SDO terminal transmits the data to be read.

A chip select not (CSN) signal indicates when the slave device 102 is selected for communication and defines a communication frame during which communication between the master device 101 and the slave device 102 is enabled. Communications between the master device 101 and the slave device 102 may be enabled on a frame-by-frame basis. Thus, the CSN signal may be referred to as a communication frame signal that indicates communication frames. For example, when the CSN signal is high, the slave device 102 is not selected and the SDO is set to high impedance. Alternatively, when the CSN signal is low, the slave device 102 is selected for communication. The communication starts and stops on a low level of the clock signal SCK.

The master and slave devices both include a chip select terminal connected by a select signal line. Here, the chip select terminal is a CSN terminal, meaning that the chip select signal is an active low signal. The chip select signal is transmitted from the master device 101 and is used to select and/or enable the slave device 102 for SPI communication. The chip select signal is low when communication with the slave device 102 is enabled and is pulled high to disconnect the slave device 102 from the SPI bus, thereby disabling communication with the slave device 102. More particularly, when the chip select signal is pulled high, the SDO terminal is placed in high impedance. Driving the CSN signal low enables the communication. Thus, the master device 101 must send a logic 0 on the CSN signal to select the slave device 102. SPI is a full-duplex interface such that both the master device 101 and the slave device 102 can send data at the same time via the MOSI and MISO data lines respectively.

A communication frame (i.e., a CSN frame) is defined by an interval during which the CSN signal is low (logic 0) between two consecutive high (logic 1) signal levels. Thus, a falling edge of the CSN signal from high-to-low denotes a start of a CSN frame and the next edge (e.g., a rising edge) from low-to-high denotes an end of the CSN frame. Each CSN frame is a predetermined number of clock cycles in length corresponding to a number of bits or bytes of an SPI buffer. For example, for an x-byte SPI buffer, each CSN frame is x-bytes in length, where x is an integer greater than one. Two consecutive CSN frames are separated by an idle period during which the CSN signal is high (logic 1) and communication from the slave device 102 is disabled.

The master device 101 includes at least one processor 103 and/or processing circuitry that performs the functions of the master device 101 described herein for performing SPI communications, including signal generation (e.g., CSN, SCK, and MOSI signals) including synchronization and control of the slave device 102, signal reception (e.g., MISO signals) and the processing thereof, data sampling in from the MISO data line, shifting data out onto the MOSI signal line, register address incrementation and tracking, register address evaluation, and automatic register address incrementation across SPI data (communication) frames, including the enabling and disabling thereof.

Similarly, the slave device 102 includes at least one processor 104 and/or processing circuitry that performs the functions of the slave device 102 described herein for performing SPI communications, including signal generation (e.g., MISO signals), signal reception (e.g., CSN, SCK, and MOSI signals) and the processing thereof, data sampling in from the MOSI data line, shifting data out onto the MISO data line, register address incrementation and tracking, register address evaluation, and automatic register address incrementation across SPI data (communication) frames based on whether or not the slave device 102 is enabled by the master device 101.

While SPI communications may be described with respect to one or more implementations, another type of digital communication protocol may be used for communication between the master device 101 and the slave device 102. Communication between the master device 101 and the slave device 102 may be enabled based on a communication frame signal provided by the master device 101 to the slave device 102.

As indicated above, FIG. 1 is provided as an example. Other examples may differ from what is described with regard to FIG. 1. The number and arrangement of components shown in FIG. 1 are provided as an example. In practice, the communication system 100 may include additional components, fewer components, different components, or differently arranged components than those shown in FIG. 1.

Figure 2:
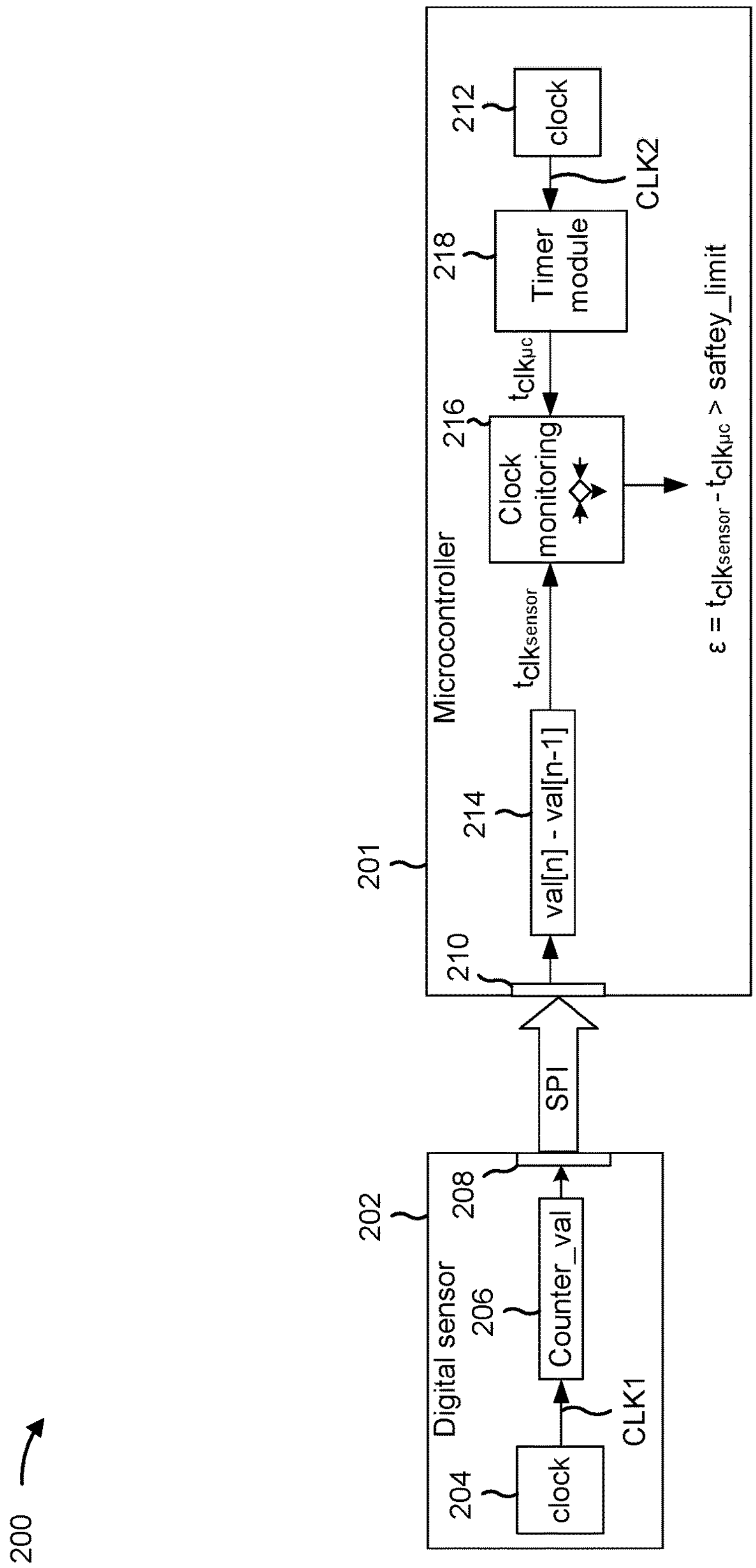
FIG. 2 shows a communication system according to one or more implementations.

FIG. 2 shows a communication system 200 according to one or more implementations. The communication system 200 includes a first IC 201 and a second IC 202. The first IC 201 may be a master device, such as a microcontroller, and may correspond to the master device 101 described in connection with FIG. 1. The second IC 202 may be a slave device, such as a digital sensor, and may correspond to the slave device 102 described in connection with FIG. 1.

The second IC 202 may include a first clock source 204, a counter 206, and a first communication interface 208. The first clock source 204 may generate a first clock signal CLK1 to be monitored by the first IC 201. The counter 206 may receive the first clock signal CLK1 and increment or decrement a counter value (counter_val) stored in a counter register based on the first clock signal CLK1. The first communication interface 208 may be configured to receive the counter value (counter_val) from the counter 206 and transmit the counter value (counter_val) from the second IC 202 to the first IC 201 via a communication bus (e.g., an SPI bus).

The first IC 201 may include a second communication interface 210, a second clock source 212, a sampling circuit 214, and a clock monitoring circuit 216. The second communication interface 210 may be configured to receive counter values from the second IC 202 via the communication bus. The second clock source 212 may generate a second clock signal CLK2 to be used for monitoring the first clock signal CLK1. The sampling circuit 214 may read (e.g., sample) two consecutive counter values val [n−1] and val [n] within the safety-related timing interval. In other words, the sampling circuit 214 may acquire a first sample val [n−1] of the counter value at a first sampling time, and acquire a second sample val [n] of the counter value at a second sampling time. Furthermore, the sampling circuit 214 may calculate a difference value $t_{clksenor}$ as a difference between the second sample val [n] and the first sample val [n−1]. The difference value $t_{clksenor}$ is proportional to a period of the first clock signal CLK1 or proportional to a frequency of the first clock signal CLK1.

The clock monitoring circuit 216 may monitor the first clock signal CLK1 based on the second clock signal CLK2. For example, the clock monitoring circuit 216 may compare the difference value $t_{clksenor}$ to the second clock signal CLK2 (e.g., to a clock value $t_{clk\mu c}$ derived from the second clock signal CLK2) and generate a timing error signal E if the difference value $t_{clksenor}$ deviates from the clock value $t_{clk\mu c}$ by more than a predetermined threshold safety_limit (e.g., a safety limit).

In some implementations, the first IC 201 may derive the clock value $t_{clk\mu c}$ using a fixed firmware schedule. For example, the clock monitoring circuit 216 may have information that the counter value (counter_val) is read out from the second IC 202 every N clock ticks of the second clock signal CLK2. Thus, N or a value derived therefrom may be used for the clock value $t_{clk\mu c}$. The first IC 201 may include a timer module 218 (e.g., a register) that stores the clock value $t_{clk\mu c}$ and provides the clock value $t_{clk\mu c}$ to the clock monitoring circuit 216.

In some implementations, the timer module 218 may include a counter that counts a number of clock ticks of the second clock signal CLK2 that occur between two comparison events. The number of clock ticks of the second clock signal CLK2 that occur between two comparison events may be provided by the timer module 218 as the clock value $t_{clk\mu c}$.

In some implementations, the timer module 218 may include a real-time clock that is driven by the second clock signal CLK2 and that is read-out at every comparison event as the clock value $t_{clk\mu c}$.

The clock monitoring circuit 216 may be configured to calculate a further difference value (e.g., $t_{clksenor}$-$t_{clk\mu c}$) as a difference between the difference value $t_{clksenor}$ and the clock value $t_{clk\mu c}$ derived from the second clock signal CLK2, and generate the timing error signal E if the further difference value does not satisfy the predetermined threshold safety_limit. For example, the further difference value may not satisfy the predetermined threshold safety_limit when the further difference value is equal to or greater than the predetermined threshold safety_limit. In other words, the further difference value may satisfy the predetermined threshold safety_limit when the further difference value is less than the predetermined threshold safety_limit. The clock monitoring circuit 216 may be configured to determine that the first clock source 204 is operating normally if the difference value $t_{clksenor}$ does not deviate from the second clock signal CLK2 by more than the predetermined threshold safety_limit (e.g., when the difference value $t_{clksenor}$ does not deviate from the clock value $t_{clk\mu c}$ by more than the predetermined threshold safety_limit).

As indicated above, FIG. 2 is provided as an example. Other examples may differ from what is described with regard to FIG. 2. The number and arrangement of components shown in FIG. 2 are provided as an example. In practice, the communication system 200 may include additional components, fewer components, different components, or differently arranged components than those shown in FIG. 2. Two or more components shown in FIG. 2 may be implemented within a single component, or a single component shown in FIG. 2 may be implemented as multiple, distributed components.

Figure 3:
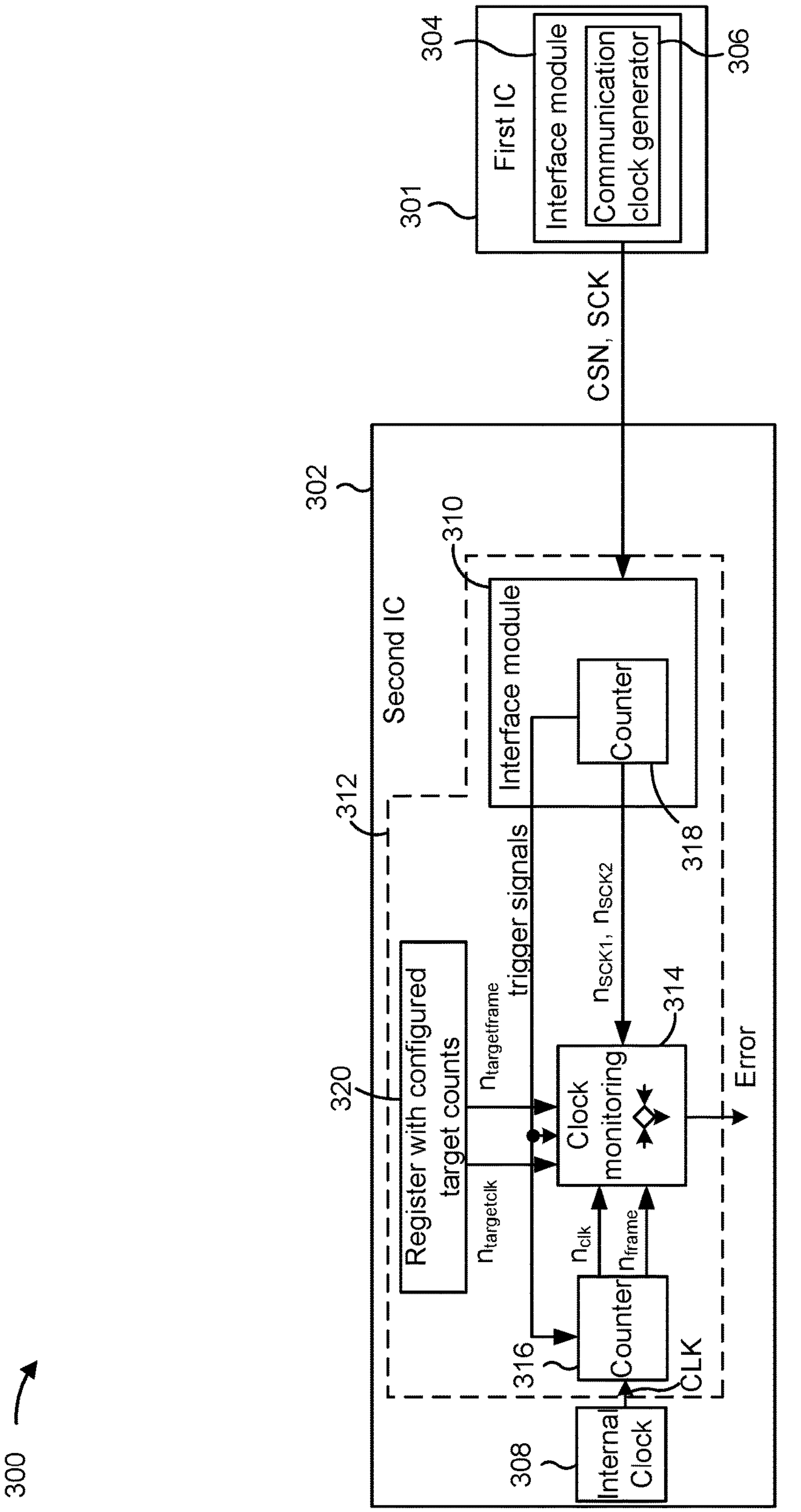
FIG. 3 shows a communication system according to one or more implementations.

FIG. 3 shows a communication system 300 according to one or more implementations. The communication system 300 includes a first IC 301 and a second IC 302. The first IC 301 may be a master device, such as a microcontroller, and may correspond to the master device 101 described in connection with FIG. 1. The second IC 302 may be a slave device, such as a digital sensor, and may correspond to the slave device 102 described in connection with FIG. 1.

The first IC 301 may include a communication interface module 304 for communicating with the second IC 302. For example, the communication interface module 304 may be an SPI communication interface module. The communication interface module 304 may include a communication clock generator 306 that is configured to generate a communication clock signal (e.g., external clock signal SCK). Thus, the communication clock generator 306 may be used as an external clock source for the second IC 302. The communication interface module 304 may also generate a communication frame signal (e.g., a CSN signal) that signals a communication frame during which data communication between the IC and the first IC 301 and the second IC 30 is enabled. The communication interface module 304 may transmit the communication clock signal and the communication frame signal in parallel to the second IC 302. The first IC 301 may provide the external clock signal SCK during active communication to the second IC 302 to shift and sample data on transmission lines of the communication bus.

A fixed number of clock cycles of the external clock signal SCK per communication frame depends on a communication frame length (e.g., 32 clock cycles for a 32-bit communication frame). For example, each CSN frame is a predetermined number of SCK clock cycles in length corresponding to a number of bytes of an SPI buffer.

The second IC 302 includes an internal clock source 308, a communication interface module 310, and a clock monitoring circuit 312. The internal clock source 308 is configured to generate an internal clock signal CLK. The internal clock signal CLK may be designed to be faster than the external clock signal SCK to support a communication transfer rate (e.g., an SPI transfer rate). For example, the internal clock signal CLK may be designed to have a plurality of clock cycles (e.g., a target number ntargetclk of clock cycles, where ntargetclk is an integer greater than one) for every one clock cycle of the external clock signal SCK. In other words, a frequency of the internal clock signal CLK may be ntargetclk times greater than a frequency of the external clock signal SCK when the internal clock signal CLK is operating normally. Thus, a frequency ratio of the two frequencies may be intended to be fixed. In addition, the internal clock signal CLK may have a target number ntargetframe of clock cycles per communication frame of the communication frame signal CSN (e.g., since the external clock signal SCK has a fixed number of external clock cycles per communication frame). The target number ntargetframe may be a multiple of ntargetclk that depends on the communication frame length. As a result, the external clock signal SCK may be used as an external clock source for performing monitoring of the internal clock signal CLK by counting a number of internal clock pulses nclk of the internal clock signal CLK per external clock period of the external clock signal SCK and/or by counting a number of internal clock pulses nframe of the internal clock signal CLK per communication frame of the communication frame signal CSN.

The communication interface module 310 may receive the external clock signal SCK and the communication frame signal CSN from the first IC 301 in parallel. The clock monitoring circuit 312 may monitor the internal clock signal CLK based on the external clock signal SCK and/or based on the communication frame signal CSN in order to evaluate a functionality of the internal clock signal CLK. For example, the clock monitoring circuit 312 may include a processing circuit 314 that may be configured to compare the internal clock signal CLK and the external clock signal SCK during a communication frame, and generate a timing error signal if a frequency of the internal clock signal CLK does not satisfy a predetermined threshold (e.g., a safety limit) relative to a frequency of the external clock signal SCK.

In some implementations, the clock monitoring circuit 312 may include a first counter 316, a second counter 318, and the processing circuit 314. The first counter 316 may be configured to receive the internal clock signal CLK and generate a first counter value representative of a first number of internal clock cycles of the internal clock signal CLK that occur during a first time interval. The second counter may be configured to receive the external clock signal SCK from the communication interface module 310, and generate a second counter value nsck1 representative of a first number of external clock cycles of the external clock signal SCK that occur during the first time interval.

In some implementations, the first counter value may be nclk, the first time interval may be one external clock period (e.g., a single external clock cycle) of the external clock signal SCK, and the second counter value nsck1 may be one. In some implementations, the first counter value may be nframe, the first time interval may be one communication frame (e.g., a single communication frame) of the communication frame signal CSN, and the second counter value nsck1 may be the predetermined number of SCK clock cycles in one communication frame. In some implementations, both intervals, including one external clock period of the external clock signal SCK and one communication frame, may be used for monitoring the internal clock signal CLK. Accordingly, the first counter value may be nclk, the first time interval may be one external clock period of the external clock signal SCK, the second counter value nsck1 may be one, a third counter value may be nframe, a second time interval may be one communication frame of the communication frame signal CSN, and the fourth counter value nsck2 may be the predetermined number of SCK clock cycles in one communication frame.

The clock monitoring circuit 312 may include a register that stores target count values, including the target number ntargetclk of clock cycles per external clock cycle and the target number ntargetframe of clock cycles per communication frame. The target count values may be used by the processing circuit 314 for determining whether or not the frequency of the internal clock signal SCK satisfies a predetermined threshold relative to the frequency of the external clock signal SCK.

The processing circuit 314 may include at least one processor and/or other processing circuitry used for determining whether or not the frequency of the internal clock signal SCK satisfies a predetermined threshold relative to the frequency of the external clock signal SCK. For example, the processing circuit 314 perform a first comparison by comparing a first measurement value derived from the first counter value nclk (or nframe) and the second counter value nsck1 with a first predetermined threshold. The first comparison may be sufficient to quantify a deviation of a frequency ratio of the frequency of the internal clock signal CLK to the frequency of the external clock signal SCK from a nominal ratio (e.g., from an expected ratio). The processing circuit 314 may generate a first timing error signal if the first comparison indicates that the first measurement value exceeds the first predetermined threshold.

In some implementations, the processing circuit 314 may calculate a first ratio of the first counter value nclk (or nframe) and the second counter value nsck1, calculate a first difference between the first ratio and a first target ratio, and generate a first timing error signal if the first difference does not satisfy the first predetermined threshold. For example, the processing circuit 314 may generate the first timing error signal if the first difference is equal to or greater than the first predetermined threshold.

In some implementations, the second counter 318 may generate a trigger signal at an end of the first time interval (e.g., at an end of each external clock cycle of the external clock signal SCK). The first counter 316 may be configured to receive the trigger signal and output the first counter value nclk (or nframe) to the processing circuit 314 based on the trigger signal (e.g., in response to the trigger signal).

In some implementations, the second counter 318 may generate a first trigger signal at a start of the first time interval, and generate a second trigger signal at an end of the first time interval. Thus, the first counter 316 may receive the first trigger signal to start counting the first number of internal clock cycles of the internal clock signal CLK and receive the second trigger signal to stop counting the first number of internal clock cycles of the internal clock signal CLK. The first counter 316 may be configured to output the first counter value nclk (or nframe) to the processing circuit 314 based on the second trigger signal (e.g., in response to receiving the second trigger signal). In some implementations, the second counter 318 may be configured to receive the communication frame signal CSN, and, when nframe is used as the first counter value, the second counter 318 may generate the first trigger signal at a start of the communication frame signaled by the communication frame signal CSN, and may generate the second trigger signal at an end of the communication frame signaled by the communication frame signal CSN.

In some implementations, the first counter 316 may be configured to receive the internal clock signal CLK, generate nclk as the first counter value representative of a first number of internal clock cycles of the internal clock signal that occur during the first time interval, and generate nframe as the third counter value representative of a second number of internal clock cycles of the internal clock signal that occur during the second time interval. Since the first time interval may be defined by a single external clock cycle of the external clock signal SCK and the second time interval may be defined by a single communication frame of the communication frame signal CSN, the first time interval and the second time interval may have different durations. Additionally, the second counter 318 may be configured to receive the external clock signal SCK, generate a second counter value nsck1 representative of a first number of external clock cycles of the external clock signal that occur during the first time interval, and generate a fourth counter value nsck2 representative of a second number of external clock cycles of the external clock signal SCK that occur during the second time interval.

The processing circuit 314 may be configured to perform a second comparison by comparing a second measurement value derived from the third counter value nframe and the fourth counter value nsck2 with a second predetermined threshold. The second comparison may be sufficient to quantify a deviation of the frequency ratio of the frequency of the internal clock signal CLK to the frequency of the external clock signal SCK from the nominal ratio. The processing circuit 314 may generate a second timing error signal if the second comparison indicates that the second measurement value exceeds the second predetermined threshold. In some implementations, the first predetermined threshold may be smaller than the second predetermined threshold. For example, since the first time interval is smaller than the second time interval in this example, an error tolerance corresponding to the first predetermined threshold may be smaller than an error tolerance corresponding to the second predetermined threshold.

In some implementations, the first counter 316 may be configured to receive the internal clock signal CLK and generate a first counter value nclk (or nframe) representative of a number of internal clock cycles of the internal clock signal that occur during a time interval. The second counter 318 may be configured to receive the external clock signal SCK and generate a second counter value nsck1 (or nsck2) representative of a number of external clock cycles of the external clock signal SCK that occur during the time interval. The processing circuit 314 may be configured to multiply the second counter value and a target counter value ntargetclk (or ntargetframe) to determine a product value, calculate a ratio of the first counter value nclk (or nframe) and the product value, and generate the timing error signal if the ratio does not satisfy the first predetermined threshold.

In some implementations, the first counter 316 may be configured to receive the internal clock signal CLK and generate a counter value nclk representative of a number of internal clock cycles of the internal clock signal that occur during a single external clock cycle of the external clock signal SCK. The second counter 318 may be configured as a communication clock detector that is configured to determine a frequency of the external clock signal SCK. The processing circuit 314 may be configured to determine a ratio of the frequency of the external clock signal and a frequency of the internal clock source 308, multiply the ratio with the counter value nclk to determine a product value, and generate the timing error signal if the product value does not satisfy a predetermined threshold. For example, the processing circuit 314 may generate the timing error signal if the product value is equal to or greater than the predetermined threshold.

In some implementations, the first counter 316 may be configured to receive the internal clock signal CLK and generate a first counter value nclk (or nframe) representative of a number of internal clock cycles of the internal clock signal that occur during a time interval. The second counter 318 may be configured to receive the external clock signal SCK and generate a second counter value nsck1 (or nsck2) representative of a number of external clock cycles of the external clock signal that occur during the time interval. The communication interface module 310 may include a communication clock detector configured to determine a frequency of the external clock signal SCK. The processing circuit 314 may be configured to calculate a first ratio of the first counter value nclk (or nframe) and the second counter value nsck1 (or nsck2), calculate a second ratio of the frequency of the external clock signal SCK and a frequency of the internal clock source 308, multiply the first ratio with the second ratio to determine a product value, and generate the timing error signal if the product value does not satisfy the predetermined threshold. For example, the processing circuit 314 may generate the timing error signal if the product value is equal to or greater than the predetermined threshold.

As indicated above, FIG. 3 is provided as an example. Other examples may differ from what is described with regard to FIG. 3. The number and arrangement of components shown in FIG. 3 are provided as an example. In practice, the communication system 300 may include additional components, fewer components, different components, or differently arranged components than those shown in FIG. 3. Two or more components shown in FIG. 3 may be implemented within a single component, or a single component shown in FIG. 3 may be implemented as multiple, distributed components.

Figure 4A:
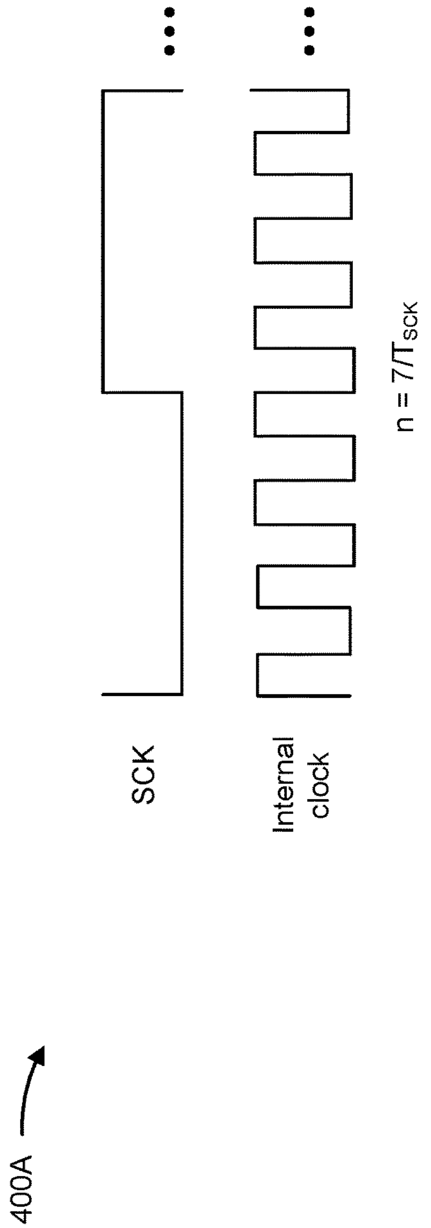
FIG. 4A shows a signal diagram of a single external clock cycle of an external clock signal according to one or more implementations.

FIG. 4A shows a signal diagram 400A of a single external clock cycle of the external clock signal SCK according to one or more implementations. The internal clock signal CLK includes a first predefined number of internal clock cycles (e.g., ntargetclk) per external clock cycle of the external clock signal SCK. In this example, the first predefined number of internal clock cycles is seven in one external clock period Tsck when the internal clock source (e.g., internal clock source 308) is operating as expected.

As indicated above, FIG. 4A is provided as an example. Other examples may differ from what is described with regard to FIG. 4A.

Figure 4B:
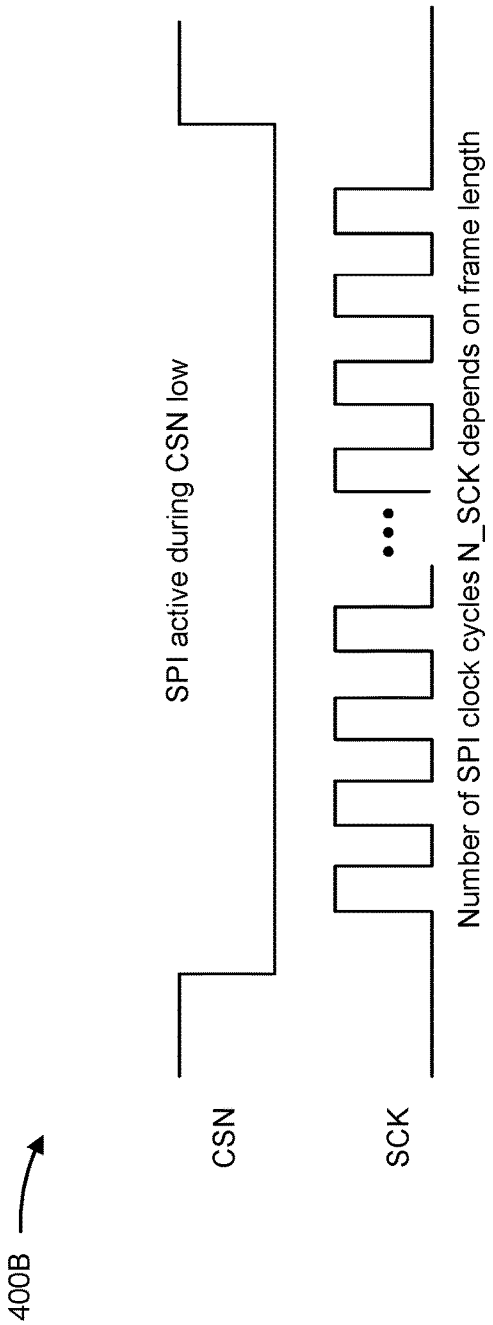
FIG. 4B shows a signal diagram of a single communication frame of a communication frame signal according to one or more implementations.

FIG. 4B shows a signal diagram 400B of a single communication frame of the communication frame signal CSN according to one or more implementations. The external clock signal SCK includes a predefined number of external clock cycles N_SCK per communication frame of the communication frame signal CSN. The internal clock signal CLK includes a second predefined number of internal clock cycles (e.g., ntargetframe) per communication frame of the communication frame signal CSN. In this example, the first predefined number of internal clock cycles is 224 (e.g., 7×32), assuming a 32-bit communication frame and seven internal clock cycles per external clock period, when the internal clock source (e.g., internal clock source 308) is operating as expected.

As indicated above, FIG. 4B is provided as an example. Other examples may differ from what is described with regard to FIG. 4B.

FIG. 5 is a diagram 500 that shows example algorithms that may be used for monitoring the internal clock source 308 according to one or more implementations. The processing circuit 314 may use one of the algorithms for monitoring the internal clock signal CLK, as described above.

As indicated above, FIG. 5 is provided as an example. Other examples may differ from what is described with regard to FIG. 5.

Figure 6:
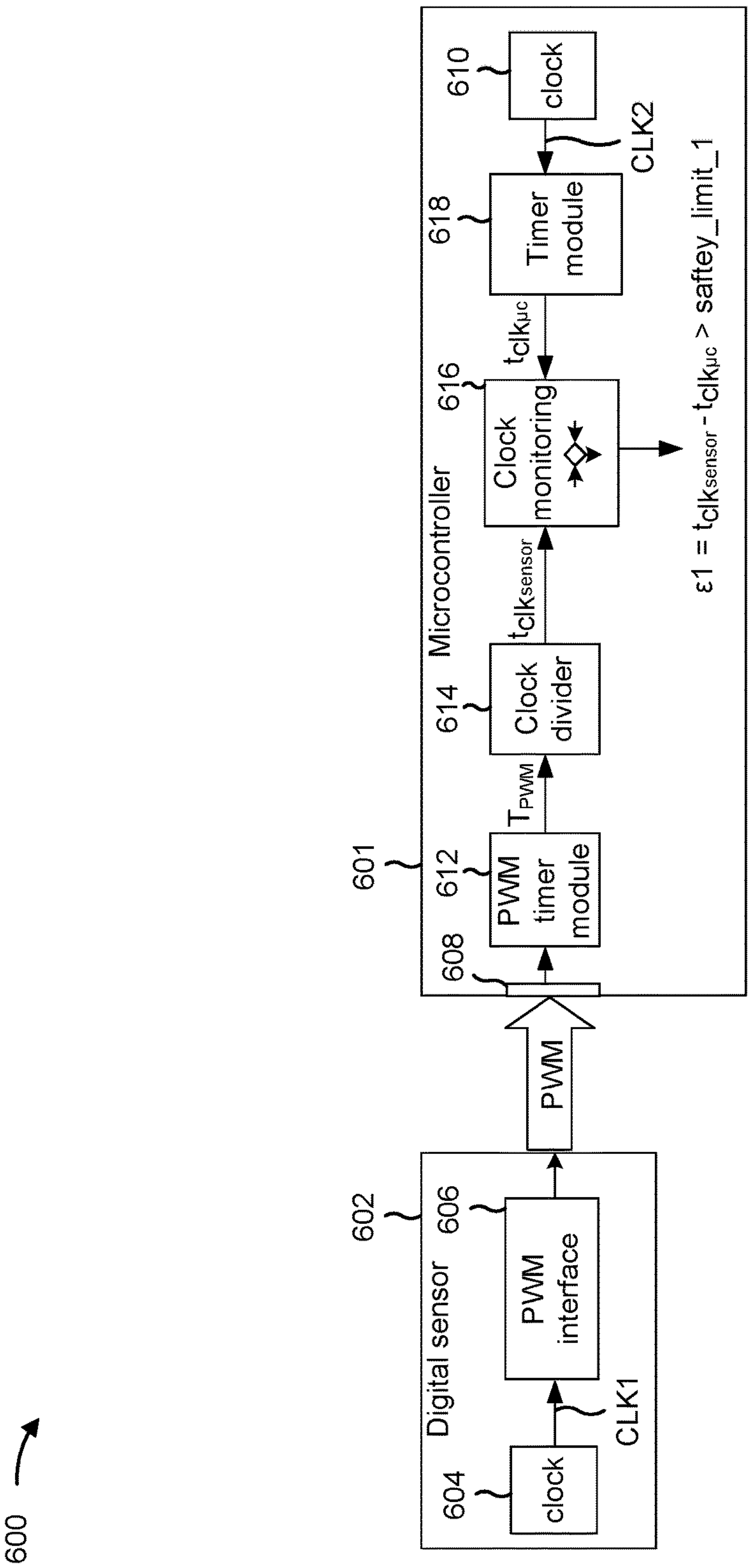
FIG. 6 shows a communication system according to one or more implementations.

FIG. 6 shows a communication system 600 according to one or more implementations. The communication system 600 includes a first IC 601 and a second IC 602. The first IC 601 may be a master device, such as a microcontroller, and may correspond to the master device 101 described in connection with FIG. 1. The second IC 602 may be a slave device, such as a digital sensor, and may correspond to the slave device 102 described in connection with FIG. 1.

The second IC 602 may include a first clock source 604 and a first communication interface 606. The first clock source 604 may generate a first clock signal CLK1 to be monitored by the first IC 601. The first communication interface 606 may be a PWM communication interface that is configured to generate a PWM signal (e.g., a communication signal) that is encoded with sensor information or other data. For example, a pulse width or a duty cycle of the PWM signal may be modulated based on sensor information to be transmitted by the first communication interface 606 to the first IC 601. For example, the second IC 602 may be an angle sensor, and the sensor information may be angle information measured by the angle sensor. The duty cycle of the PWM signal may be adjusted based on a measured angle such that the duty cycle of the PWM signal is representative of the measured angle.

In addition, a PWM period $T_{PWM}$ of the PWM signal is fixed. In other words, a time interval between two consecutive falling transition edges or two consecutive rising transition edges that define the PWM period $T_{PWM}$ is fixed for each PWM cycle. The PWM period $T_{PWM}$ may be a proportional to a clock period of the first clock signal CLK1. For example, the PWM period $T_{PWM}$ may be a scaled version of a clock period of the first clock signal CLK1. For example, the first communication interface 606 may receive the first clock signal CLK1 and derive the PWM period $T_{PWM}$ from the clock period of the first clock signal CLK1 by applying a scaling factor to the first clock signal CLK1 or to the clock period of the first clock signal CLK1. In some implementations, the scaling factor may be an up-scaling factor (e.g., a scaling factor greater than one) such that the PWM period $T_{PWM}$ is a multiple factor greater than the clock period of the first clock signal CLK1. As a result, a PWM-frequency of the PWM signal generated using the first clock signal CLK1 is a direct measure of a clock frequency of the first clock signal CLK1. The first communication interface 606 may transmit the PWM signal to the first IC 610 via a communication bus (e.g., a PWM bus).

The first IC 601 may include a second communication interface 608, a second clock source 610, a sampling circuit 612, a scaler 614, a clock monitoring circuit 616, and a timer module 618. The second communication interface 608 may be configured to receive the PWM signal from the second IC 602 via the communication bus. In some implementations, the sampling circuit 612 may be part of the second communication interface 608. The second clock source 610 may generate a second clock signal CLK2 to be used for monitoring the first clock signal CLK1. The sampling circuit 612 (e.g., a PWM timer module) may read (e.g., sample) two consecutive falling edges of the PWM signal to determine the PWM period $T_{PWM}$ of the PWM signal. Alternatively, if the PWM period $T_{PWM}$ is defined by two consecutive rising edges, the sampling circuit 612 may read (e.g., sample) the two consecutive rising edges of the PWM signal to determine the PWM period $T_{PWM}$ of the PWM signal. Whether two consecutive falling edges or two consecutive rising edges are used to define the PWM period $T_{PWM}$ may be a matter of design choice.

The scaler 614 (e.g., a clock divider) may be configured to scale the PWM period $T_{PWM}$ by a scaling factor to derive a first clock value $t_{clksenor}$ representative of the clock period of the first clock signal CLK. The scaling factor used by scaler 614 may be an inverse value to the scaling factor used by the first communication interface 606. Thus, the scaling factor used by the scaler 614 may be a down-scaling factor (e.g., a scaling factor less than one) that is inversely proportional to an up-scaling factor used by the first communication interface 606.

The clock monitoring circuit 616 may be configured to receive the first clock value $t_{clksenor}$ from the scaler 614 and a second clock value $t_{clk\mu c}$ that is derived from the second clock signal CLK, and perform an evaluation. For example, the clock monitoring circuit 616 may generate a timing error signal ε1 if the first clock value $t_{clksenor}$ deviates from a second clock value $t_{clk\mu c}$ by more than a predetermined threshold safety limit_1. For example, the clock monitoring circuit 616 may be configured to calculate a difference between first clock value $t_{clksenor}$ and the second clock value $t_{clk\mu c}$, and generate the timing error signal ε1 if the difference is greater than the predetermined threshold (e.g., $\varepsilon 1 = t_{clksenor} - t_{clk\mu c} > \text{safety limit\_1}$). Alternatively, the clock monitoring circuit 616 may be configured to determine that the first clock source 604 is operating normally if the first clock value $t_{clksenor}$ does not deviate from the second clock value $t_{clk\mu c}$ by more than the predetermined threshold (e.g., $\varepsilon = t_{clksenor} - t_{clk\mu c} \leq \text{safety limit\_1}$). Based on determining that the first clock source 604 is operating normally, the clock monitoring circuit 616 may indicate that the first clock source 604 is operating normally (e.g., by not generating the timing error signal ε1).

In some implementations, the first IC 601 may derive the second clock value $t_{clk\mu c}$ using a fixed firmware schedule. The first IC 601 may include the timer module 618 (e.g., a register) that stores the second clock value $t_{clk\mu c}$ and provides the second clock value $t_{clk\mu c}$ to the clock monitoring circuit 616. In some implementations, the timer module 618 may include a counter that counts a number of clock ticks of the second clock signal CLK2 that occur between a predetermined interval. The number of clock ticks of the second clock signal CLK2 that occur in the predetermined interval may be provided by the timer module 618 as the second clock value $t_{clk\mu c}$. In some implementations, the timer module 618 may include a real-time clock that is driven by the second clock signal CLK2 and that is read-out at every sampling event of the sampling circuit 612 as the clock value $t_{clk\mu c}$.

A clock-monitoring inside the second IC 602 can only be implemented with low accuracy and limited diagnostic coverage (e.g., with a high effort for a low outcome). Using the first IC 601 for performing external clock monitoring of the PWM-frequency avoids complex implementation, with reduced silicon area, reduced verification (processing) effort, and reduced test-time). Furthermore, using the first IC 601 for performing external clock monitoring of the PWM-frequency results in more accurate clock monitoring through use of an accurate quartz oscillator (e.g., the second clock source 610) of the first IC 601 without trimming or use of a redundant safety-clock. The clock monitoring may be used as a safety-measure to ensure the detection of common cause failures.

As indicated above, FIG. 6 is provided as an example. Other examples may differ from what is described with regard to FIG. 6. The number and arrangement of components shown in FIG. 6 are provided as an example. In practice, the communication system 600 may include additional components, fewer components, different components, or differently arranged components than those shown in FIG. 6. Two or more components shown in FIG. 6 may be implemented within a single component, or a single component shown in FIG. 6 may be implemented as multiple, distributed components.

Figure 7:
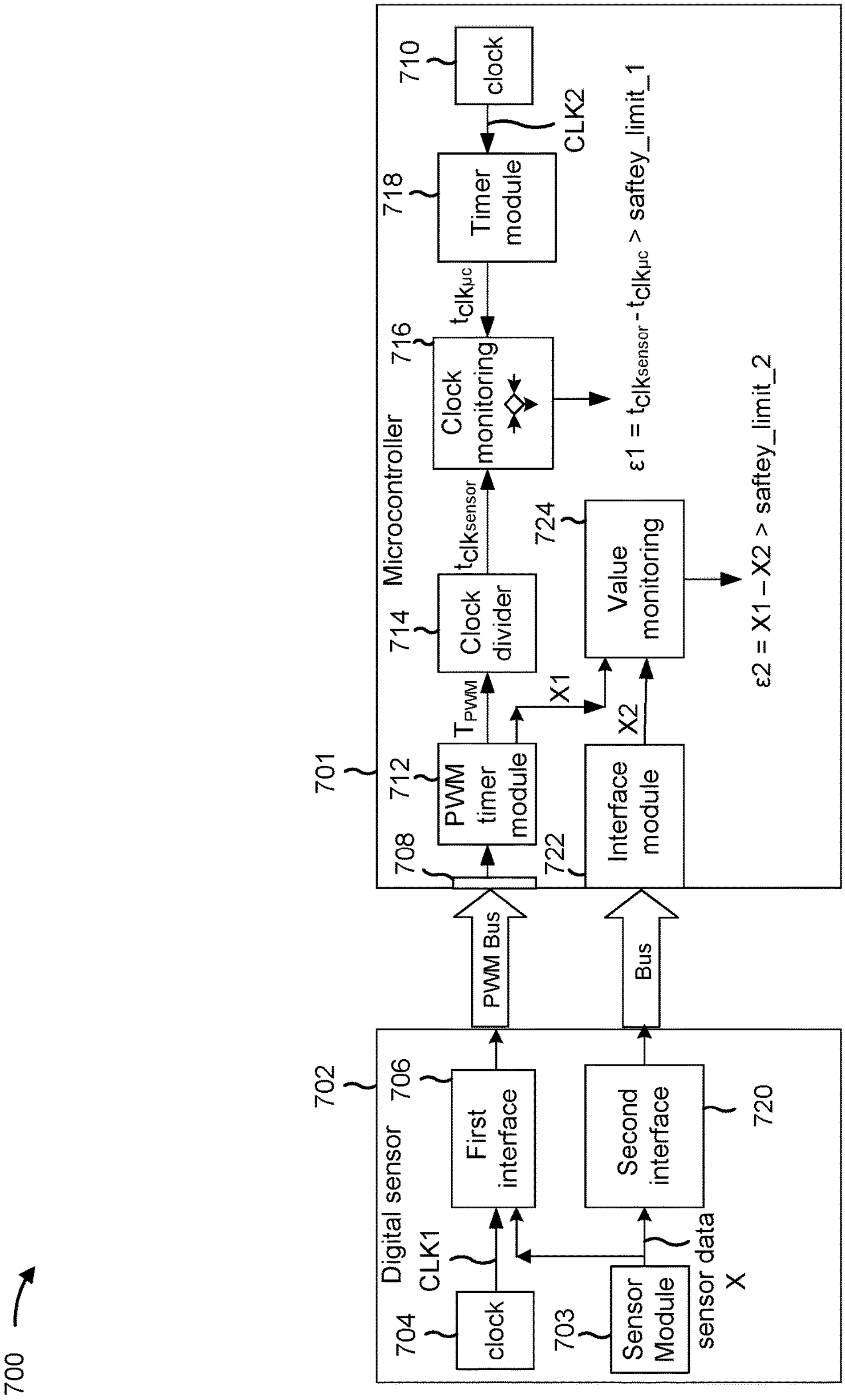
FIG. 7 shows a communication system according to one or more implementations.

FIG. 7 shows a communication system 700 according to one or more implementations. The communication system 700 is similar to the communication system 600 described in connection with FIG. 6, except the communication system 700 includes an additional interface and additional monitoring circuitry for value monitoring.

The second IC 702 may include a sensor module 703, the first clock source 704 and the first communication interface 706 and a second communication interface 720. The first clock source 704 may generate a first clock signal CLK1 to be monitored by the first IC 701, as described in connection with FIG. 7. The sensor module 703 may generate sensor data X based on a sensed or measured property, such as a magnetic field or a pressure. The first communication interface 706 may be a PWM communication interface that is configured to generate a first communication signal (e.g., a PWM signal) that is encoded with the sensor data X or other sensor information. For example, a pulse width or a duty cycle of the first communication signal may be modulated based on sensor data X to be transmitted by the first communication interface 706 to the first IC 701. The second communication interface 720 may be a second PWM communication interface, an incremental interface (ABZ), a Hall switch mode-emulating interface (UVW), or any other analog or digital communication interface, that is configured to generate a second communication signal that is encoded with the sensor data X or the other sensor information. For example, pulses transmitted on an ABZ interface may be modulated based on sensor data X to be transmitted by the second communication interface 720 to the first IC 701.

The first communication signal may have a signal period that is based on the first clock signal CLK1. The first communication signal and the second communication signal may encode the same, or redundant, or diverse sensor data. For example, a duty cycle of the first communication signal may encode first sensor data X1, and the second communication signal may encode the same sensor data, redundant sensor data, or diverse sensor data X2 (e.g., second sensor data X2).

The first IC 701 may include a third communication interface 708, a second clock source 710, a sampling circuit 712, a scaler 714, a clock monitoring circuit 716, and a timer module 718, a fourth communication interface 722 (e.g., an interface module), and a value monitoring circuit 724. The third communication interface 708 may be configured to receive the first communication signal from the second IC 702 via the first communication bus (e.g., a PWM bus), and the fourth communication interface 722 may be configured to receive the second communication signal from the second IC 702 via a second communication bus. In some implementations, the sampling circuit 712 may be part of the third communication interface 708.

The second clock source 710, the sampling circuit 712, the scaler 714, the clock monitoring circuit 716, and the timer module 718 may operate similar to the second clock source 610, the sampling circuit 612, the scaler 614, the clock monitoring circuit 616, and the timer module 618 of the communication system 600, respectively. Thus, the clock monitoring circuit 716 may generate a timing error signal ε1 if the first clock value $t_{clksenor}$ deviates from a second clock value $t_{clk\mu c}$ by more than a first predetermined threshold safety_limit_1.

The sampling circuit 712 (e.g., a PWM timer module) may read (e.g., sample) two consecutive falling edges or two consecutive falling edges of the first PWM signal to determine the PWM period $T_{PWM}$ of the first communication signal. Alternatively, the sampling circuit 712 may determine a first pulse width of the first communication signal. Thus, the first communication signal is representative of a first value (e.g., the PWM period $T_{PWM}$ or the pulse width), and the sampling circuit 712 may decode the first communication signal to determine the first value.

The fourth communication interface 722 (e.g., an ABZ interface module) may read (e.g., sample) the second communication signal to determine a second value corresponding to the sensor data X2. The second value may be represented by a number of pulses and a relationship between pulses on different signal lines transmitted via the second communication signal, a serial binary code transmitted on the second communication signal, or parallel binary code transmitted on the second communication signal The value monitoring circuit 724 may be configured to receive the first value corresponding to the first sensor data X1 and the second value corresponding to the second sensor data X2, compare the first value X1 and the second value X2, and generate a communication error signal ε2 if the first value X1 deviates from the second value X2 by more than a second predetermined threshold. For example, the value monitoring circuit 724 may be configured to calculate a difference between the first sensor datum X1 and the second sensor datum X2, and generate the communication error signal ε2 if the difference is greater than the second predetermined threshold safety limit_2 (e.g., ε2=X1−X2>safety limit_2).

Thus, the first IC 701 may be used to perform both clock monitoring of the second IC 702 and value monitoring of the second IC 702.

As indicated above, FIG. 7 is provided as an example. Other examples may differ from what is described with regard to FIG. 7. The number and arrangement of components shown in FIG. 7 are provided as an example. In practice, the communication system 700 may include additional components, fewer components, different components, or differently arranged components than those shown in FIG. 7. Two or more components shown in FIG. 7 may be implemented within a single component, or a single component shown in FIG. 7 may be implemented as multiple, distributed components.

The following provides an overview of some Aspects of the present disclosure:

Aspect 1: A communication system, comprising: a first integrated circuit (IC) comprising: a first clock source configured to generate a first clock signal; a counter configured to receive the first clock signal and increment or decrement a counter value based on the first clock signal; and a first communication interface configured to receive the counter value from the counter and transmit the counter value from the first IC; and a second IC comprising: a second clock source configured to generate a second clock signal; a sampling circuit configured to acquire a first sample of the counter value at a first sampling time, acquire a second sample of the counter value at a second sampling time, and calculate a difference value as a difference between the second sample and the first sample; and a clock monitoring circuit configured to monitor the first clock signal based on the second clock signal, wherein the clock monitoring circuit is configured to compare the difference value to the second clock signal and generate a timing error signal if the difference value deviates from a clock value derived from the second clock signal by more than a predetermined threshold.

Aspect 2: The communication system of Aspect 1, wherein the difference value is proportional to a period of the first clock signal or proportional to a frequency of the first clock signal.

Aspect 3: The communication system of any of Aspects 1-2, wherein the clock monitoring circuit is configured to calculate a further difference value as a difference between the difference value and the clock value derived from the second clock signal, and generate the timing error signal if the further difference value does not satisfy the predetermined threshold.

Aspect 4: The communication system of any of Aspects 1-3, wherein the clock monitoring circuit is configured to determine that the first clock source is operating normally if the difference value does not deviate from the clock value by more than the predetermined threshold.

Aspect 5: The communication system of any of Aspects 1-4, wherein the first IC is integrated on a first semiconductor chip and the second IC is integrated on a second semiconductor chip.

Aspect 6: An integrated circuit (IC), comprising: an internal clock source configured to generate an internal clock signal; a communication interface configured to receive an external clock signal from an external clock source and a communication frame signal that signals a communication frame during which data communication between the IC and the external clock source is enabled, wherein the external clock signal and the communication frame signal are received in parallel; and a clock monitoring circuit configured to monitor the internal clock signal based on the external clock signal, wherein the clock monitoring circuit is configured to compare the internal clock signal and the external clock signal during the communication frame, and generate a timing error signal if a frequency of the internal clock signal does not satisfy a predetermined threshold relative to a frequency of the external clock signal.

Aspect 7: The IC of Aspect 6, wherein the predetermined threshold is a first predetermined threshold, and wherein the clock monitoring circuit comprises: a first counter configured to receive the internal clock signal and generate a first counter value representative of a first number of internal clock cycles of the internal clock signal that occur during a first time interval; a second counter configured to receive the external clock signal and generate a second counter value representative of a first number of external clock cycles of the external clock signal that occur during the first time interval; and a processing unit configured to perform a first comparison by comparing a first measurement value derived from the first counter value and the second counter value with the first predetermined threshold, wherein the first comparison is sufficient to quantify a deviation of a frequency ratio of the frequency of the internal clock signal to the frequency of the external clock signal from a nominal ratio, and wherein the processing unit is configured to generate a first timing error signal if the first comparison indicates that the first measurement value exceeds the first predetermined threshold.

Aspect 8: The IC of Aspect 7, wherein the first time interval is defined by a single external clock cycle of the external clock signal.

Aspect 9: The IC of Aspect 7, wherein the first time interval is defined by a single communication frame of the communication frame signal.

Aspect 10: The IC of Aspect 7, wherein the second counter is configured to generate a trigger signal at an end of the first time interval, and wherein the first counter is configured to receive the trigger signal and output the first counter value to the processing unit based on the trigger signal.

Aspect 11: The IC of Aspect 7, wherein the second counter is configured to generate a first trigger signal at a start of the first time interval, and generate a second trigger signal at an end of the first time interval, wherein the first counter is configured to receive the first trigger signal to start counting the first number of internal clock cycles of the internal clock signal and receive the second trigger signal to stop counting the first number of internal clock cycles of the internal clock signal, and wherein the first counter is configured to output the first counter value to the processing unit based on the second trigger signal.

Aspect 12: The IC of Aspect 11, wherein the second counter is configured to receive the communication frame signal and generate the first trigger signal at a start of the communication frame signaled by the communication frame signal, and generate the second trigger signal at an end of the communication frame signaled by the communication frame signal.

Aspect 13: The IC of Aspect 7, wherein the first counter is configured to receive the internal clock signal and generate a third counter value representative of a second number of internal clock cycles of the internal clock signal that occur during a second time interval, wherein the first time interval and the second time interval have different durations, wherein the second counter is configured to receive the external clock signal and generate a fourth counter value representative of a second number of external clock cycles of the external clock signal that occur during the second time interval, and a processing unit configured to perform a second comparison by comparing a second measurement value derived from the third counter value and the fourth counter value with a second predetermined threshold, wherein the second comparison is sufficient to quantify a deviation of the frequency ratio of the frequency of the internal clock signal to the frequency of the external clock signal from the nominal ratio, and wherein the processing unit is configured to generate a second timing error signal if the second comparison indicates that the second measurement value exceeds the second predetermined threshold.

Aspect 14: The IC of Aspect 13, wherein the first time interval is defined by a single external clock cycle of the external clock signal, and wherein the second time interval is defined by a single communication frame of the communication frame signal.

Aspect 15: The IC of Aspect 14, wherein the first predetermined threshold is smaller than the second predetermined threshold.

Aspect 16: The IC of Aspect 13, wherein the external clock signal includes a predefined number of external clock cycles per communication frame of the communication frame signal, and wherein, during normal operation of the internal clock source, the internal clock signal includes a first predefined number of internal clock cycles per external clock cycle of the external clock signal and a second predefined number of internal clock cycles per communication frame of the communication frame signal.

Aspect 17: The IC of any of Aspects 6-16, wherein the clock monitoring circuit comprises: a first counter configured to receive the internal clock signal and generate a first counter value representative of a number of internal clock cycles of the internal clock signal that occur during a time interval; a second counter configured to receive the external clock signal and generate a second counter value representative of a number of external clock cycles of the external clock signal that occur during the time interval; and a processing circuit configured to multiply the second counter value and a target counter value to determine a product value, calculate a ratio of the first counter value and the product value, and generate the timing error signal if the ratio does not satisfy the predetermined threshold.

Aspect 18: The IC of any of Aspects 6-17, wherein the clock monitoring circuit comprises: a counter configured to receive the internal clock signal and generate a counter value representative of a number of internal clock cycles of the internal clock signal that occur during a single external clock cycle of the external clock signal; a communication clock detector configured to determine a frequency of the external clock signal; and a processing circuit configured to determine a ratio of the frequency of the external clock signal and a frequency of the internal clock source, multiply the ratio with the counter value to determine a product value, and generate the timing error signal if the product value does not satisfy the predetermined threshold.

Aspect 19: The IC of any of Aspects 6-18, wherein the clock monitoring circuit comprises: a first counter configured to receive the internal clock signal and generate a first counter value representative of a number of internal clock cycles of the internal clock signal that occur during a time interval; a second counter configured to receive the external clock signal and generate a second counter value representative of a number of external clock cycles of the external clock signal that occur during the time interval; a communication clock detector configured to determine a frequency of the external clock signal; and a processing circuit configured to calculate a first ratio of the first counter value and the second counter value, calculate a second ratio of the frequency of the external clock signal and a frequency of the internal clock source, multiply the first ratio with the second ratio to determine a product value, and generate the timing error signal if the product value does not satisfy the predetermined threshold.

Aspect 20: The IC of any of Aspects 6-19, wherein the communication interface is a serial peripheral interface (SPI), the external clock signal is an SPI clock signal, and the communication frame signal is a chip select signal.

Aspect 21: The IC of any of Aspects 6-20, wherein the external clock source is a microcontroller with an oscillator that is configured to generate the external clock signal.

Aspect 22: A method of monitoring an internal clock source of an integrated circuit (IC) using an external clock signal, the method comprising: generating, by the internal clock source, an internal clock signal; receiving, by a communication interface of the IC, the external clock signal from an external clock source; receiving, by the communication interface of the IC, a communication frame signal from the external clock source, wherein the communication frame signal signals a plurality of communication frames during which data communication between the IC and the external clock source is enabled, and wherein the external clock signal and the communication frame signal are received in parallel; and monitoring, by a clock monitoring circuit of the IC, the internal clock signal based on the external clock signal, including: comparing the internal clock signal and the external clock signal during the plurality of communication frames; and generating a timing error signal if a frequency of the internal clock signal does not satisfy a predetermined threshold relative to a frequency of the external clock signal, wherein monitoring the internal clock signal is disabled outside of the plurality of communication frames.

Aspect 23: A communication system, comprising: a first integrated circuit (IC) comprising: a first clock source configured to generate a first clock signal; and a communication interface configured to generate a communication signal having a signal period proportional to a first clock period of the first clock signal, and transmit the communication signal; a second IC comprising: a second clock source configured to generate a second clock signal having a second clock period; a sampling circuit configured to detect transition edges of the communication signal to determine the signal period of the communication signal; a scaler configured to scale the signal period by a first scaling factor to derive a first clock value representative of the first clock period of the first clock signal; and a clock monitoring circuit configured to monitor the first clock signal based on the second clock signal, wherein the clock monitoring circuit is configured to receive the first clock value from the scaler, and generate a timing error signal if the first clock value deviates from a second clock value derived from the second clock signal by more than a predetermined threshold.

Aspect 24: The communication system of Aspect 23, wherein the communication interface is a pulse-width modulation (PWM) interface and the communication signal is a PWM signal.

Aspect 25: The communication system of any of Aspects 23-24, wherein the second clock value is representative of the second clock period, and wherein the clock monitoring circuit is configured to calculate a difference between the first clock value and the second clock value, and generate the timing error signal if the difference is greater than the predetermined threshold.

Aspect 26: The communication system of Aspect 25, wherein the second IC comprises a timer module configured to receive the second clock signal and derive the second clock value representative of the second clock period from the second clock signal.

Aspect 27: The communication system of any of Aspects 23-25, wherein the PWM communication interface is configured to scale the first clock period of the first clock signal by a second scaling factor to derive the PWM period, and wherein the second scaling factor is an inverse factor of the first scaling factor.

Aspect 28: The communication system of any of Aspects 23-27, wherein the clock monitoring circuit is configured to determine that the first clock source is operating normally if the first clock value does not deviate from the second clock value by more than the predetermined threshold.

Aspect 29: The communication system of any of Aspects 23-28, wherein the first IC is integrated on a first semiconductor chip and the second IC is integrated on a second semiconductor chip.

Aspect 30: The communication system of any of Aspects 23-29, wherein the first signal is representative of a first value to be transmitted to the second IC, wherein the first IC comprises a second communication interface configured to generate a second communication signal representative of a second value to be transmitted to the second IC, wherein the second IC comprises a third communication interface configured to receive the first communication signal and decode the first communication signal to obtain the first value, and a fourth communication interface configured to receive the second communication signal and decode the second communication signal to obtain the second value, and wherein the second IC comprises a value monitoring circuit configured to compare the first value and the second value, and generate a communication error signal if the first value deviates from the second value by more than a second predetermined threshold.

Aspect 31: The communication system of Aspect 30, wherein the first value is represented by a first pulse width, a duty cycle, or the signal period of the first communication signal, and the second value is represented by a number of pulses and a relationship between pulses on different signal lines transmitted via the second communication signal, a serial binary code on the second communication signal, or parallel binary code on the second communication signal.

Aspect 32: A system configured to perform one or more operations recited in one or more of Aspects 1-31.

Aspect 33: An apparatus comprising means for performing one or more operations recited in one or more of Aspects 1-31.

Aspect 34: A non-transitory computer-readable medium storing a set of instructions, the set of instructions comprising one or more instructions that, when executed by a device, cause the device to perform one or more operations recited in one or more of Aspects 1-31.

Aspect 35: A computer program product comprising instructions or code for executing one or more operations recited in one or more of Aspects 1-31.

The foregoing disclosure provides illustration and description, but is not intended to be exhaustive or to limit the implementations to the precise form disclosed. Modifications and variations may be made in light of the above disclosure or may be acquired from practice of the implementations.

Some implementations may be described herein in connection with thresholds. As used herein, "satisfying" a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

As used herein, the term "component" is intended to be broadly construed as hardware, firmware, or a combination of hardware and software. Systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Any of the processing components may be implemented as a central processing unit (CPU) or other processor reading and executing a software program from a non-transitory computer-readable recording medium such as a hard disk or a semiconductor memory device. For example, instructions may be executed by one or more processors, such as one or more CPUs, digital signal processors (DSPs), general-purpose microprocessors, application-specific integrated circuits (ASICs), field programmable logic arrays (FPLAs), programmable logic controller (PLC), or other equivalent integrated or discrete logic circuitry. Accordingly, the term "processor," as used herein, refers to any of the foregoing structures or any other structure suitable for implementation of the techniques described herein. Software may be stored on a non-transitory computer-readable medium such that the non-transitory computer readable medium includes program code or a program algorithm stored thereon that, when executed, causes the processor, via a computer program, to perform the steps of a method.

A controller including hardware may also perform one or more of the techniques of this disclosure. A controller, including one or more processors, may use electrical signals and digital algorithms to perform its receptive, analytic, and control functions, which may further include corrective functions. Such hardware, software, and firmware may be implemented within the same device or within separate devices to support the various techniques described in this disclosure.

A signal processing circuit and/or a signal conditioning circuit may receive one or more signals (e.g., measurement signals) from one or more components in the form of raw measurement data and may derive, from the measurement signal, further information. "Signal conditioning," as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation, and any other processes required to make a signal suitable for processing after conditioning.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a and b, a and c, b and c, and a, b, and c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some implementations, a single act may include or may be broken into multiple sub acts. Such sub acts may be included and part of the disclosure of this single act unless explicitly excluded.

When "a component" or "one or more components" (or another element, such as "a controller" or "one or more controllers") is described or claimed (within a single claim or across multiple claims) as performing multiple operations or being configured to perform multiple operations, this language is intended to broadly cover a variety of architectures and environments. For example, unless explicitly claimed otherwise (e.g., via the use of "first component" and "second component" or other language that differentiates components in the claims), this language is intended to cover a single component performing or being configured to perform all of the operations, a group of components collectively performing or being configured to perform all of the operations, a first component performing or being configured to perform a first operation and a second component performing or being configured to perform a second operation, or any combination of components performing or being configured to perform the operations. For example, when a claim has the form "one or more components configured to: perform X; perform Y; and perform Z," that claim should be interpreted to mean "one or more components configured to perform X; one or more (possibly different) components configured to perform Y; and one or more (also possibly different) components configured to perform Z."

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. An integrated circuit (IC), comprising:

an internal clock source configured to generate an internal clock signal;

a communication interface configured to receive an external clock signal from an external clock source and a communication frame signal that signals a communication frame during which data communication between the IC and the external clock source is enabled, wherein the external clock signal and the communication frame signal are received in parallel; and a clock monitoring circuit configured to monitor the internal clock signal based on the external clock signal, wherein the clock monitoring circuit is configured to compare the internal clock signal and the external clock signal during the communication frame, and generate a timing error signal if a frequency of the internal clock signal does not satisfy a predetermined threshold relative to a frequency of the external clock signal, wherein the predetermined threshold is a first predetermined threshold, wherein the clock monitoring circuit comprises:

a first counter configured to receive the internal clock signal and generate a first counter value that is representative of a first number of internal clock cycles of the internal clock signal that occur during a first time interval;

a second counter configured to receive the external clock signal and generate a second counter value that is representative of a first number of external clock cycles of the external clock signal that occur during the first time interval; and a processing unit configured to perform a first comparison by comparing a first measurement value derived from the first counter value and the second counter value with the first predetermined threshold, wherein the first comparison is sufficient to quantify a deviation of a frequency ratio of the frequency of the internal clock signal to the frequency of the external clock signal from a nominal ratio, and wherein the processing unit is configured to generate a first timing error signal if the first comparison indicates that the first measurement value exceeds the first predetermined threshold, wherein the first counter is configured to receive the internal clock signal and generate a third counter value that is representative of a second number of internal clock cycles of the internal clock signal that occur during a second time interval, wherein the first time interval and the second time interval have different durations, wherein the second counter is configured to receive the external clock signal and generate a fourth counter value that is representative of a second number of external clock cycles of the external clock signal that occur during the second time interval, and wherein the processing unit is configured to perform a second comparison by comparing a second measurement value derived from the third counter value and the fourth counter value with a second predetermined threshold, wherein the second comparison is sufficient to quantify a deviation of the frequency ratio of the frequency of the internal clock signal to the frequency of the external clock signal from the nominal ratio, and wherein the processing unit is configured to generate a second timing error signal if the second comparison indicates that the second measurement value exceeds the second predetermined threshold.

2. The IC of claim 1, wherein the first time interval is defined by a single external clock cycle of the external clock signal, and wherein the second time interval is defined by a single communication frame of the communication frame signal.

3. The IC of claim 2, wherein the first predetermined threshold is smaller than the second predetermined threshold.

4. The IC of claim 1, wherein the external clock signal includes a predefined number of external clock cycles per communication frame of the communication frame signal, and wherein, during normal operation of the internal clock source, the internal clock signal includes a first predefined number of internal clock cycles per external clock cycle of the external clock signal and a second predefined number of internal clock cycles per communication frame of the communication frame signal.

5. A communication system, comprising:

a first integrated circuit (IC) comprising:

a first clock source configured to generate a first clock signal; and a first communication interface configured to generate a first communication signal having a signal period proportional to a first clock period of the first clock signal, and transmit the first communication signal;

a second IC comprising:

a second clock source configured to generate a second clock signal having a second clock period;

a sampling circuit configured to detect transition edges of the first communication signal to determine the signal period of the first communication signal;

a scaler configured to scale the signal period by a first scaling factor to derive a first clock value that is representative of the first clock period of the first clock signal; and a clock monitoring circuit configured to monitor the first clock signal based on the second clock signal, wherein the clock monitoring circuit is configured to receive the first clock value from the scaler, and generate a timing error signal if the first clock value deviates from a second clock value derived from the second clock signal by more than a first predetermined threshold.

6. The communication system of claim 5, wherein the first communication interface is a pulse-width modulation (PWM) interface and the first communication signal is a PWM signal.

7. The communication system of claim 5, wherein the second clock value is representative of the second clock period, and wherein the clock monitoring circuit is configured to calculate a difference between the first clock value and the second clock value, and generate the timing error signal if the difference is greater than the first predetermined threshold.

8. The communication system of claim 7, wherein the second IC comprises a timer module configured to receive the second clock signal and derive the second clock value from the second clock signal.

9. The communication system of claim 5, wherein the clock monitoring circuit is configured to determine that the first clock source is operating normally if the first clock value does not deviate from the second clock value by more than the first predetermined threshold.

10. The communication system of claim 5, wherein the first IC is integrated on a first semiconductor chip and the second IC is integrated on a second semiconductor chip.

11. The communication system of claim 5, wherein the first communication signal is representative of a first value to be transmitted to the second IC, wherein the first IC comprises a second communication interface configured to generate a second communication signal that is representative of a second value to be transmitted to the second IC, wherein the second IC comprises a third communication interface configured to receive the first communication signal and decode the first communication signal to obtain the first value, and a fourth communication interface configured to receive the second communication signal and decode the second communication signal to obtain the second value, and wherein the second IC comprises a value monitoring circuit configured to compare the first value and the second value, and generate a communication error signal if the first value deviates from the second value by more than a second predetermined threshold.

12. The communication system of claim 11, wherein the first value is represented by a first pulse width, a duty cycle, or the signal period of the first communication signal, and the second value is represented by a number of pulses and a relationship between pulses on different signal lines transmitted via the second communication signal, a serial binary code on the second communication signal, or parallel binary code on the second communication signal.

* * * * *